(12) United States Patent
Wei et al.

(10) Patent No.: US 12,236,290 B2
(45) Date of Patent: Feb. 25, 2025

(54) METHOD, APPARATUS AND DEVICE FOR SHARING MICROSERVICE APPLICATION DATA

(71) Applicant: INSPUR GENERSOFT CO., LTD., Jinan (CN)

(72) Inventors: Daisen Wei, Jinan (CN); Weibo Zheng, Jinan (CN); Yucheng Li, Jinan (CN); Xiangguo Zhou, Jinan (CN); Lixin Sun, Jinan (CN)

(73) Assignee: INSPUR GENERSOFT CO., LTD., Jinan (CN)

( * ) Notice: Subject to any disclaimer, the term of this patent is extended or adjusted under 35 U.S.C. 154(b) by 0 days.

(21) Appl. No.: 18/665,633

(22) Filed: May 16, 2024

(65) Prior Publication Data

US 2024/0362091 A1 Oct. 31, 2024

Related U.S. Application Data

(63) Continuation of application No. PCT/CN2023/110600, filed on Aug. 1, 2023.

(30) Foreign Application Priority Data

Apr. 26, 2023 (CN) .......................... 202310456957.6

(51) Int. Cl.
*G06F 8/20* (2018.01)
*G06F 9/54* (2006.01)

(52) U.S. Cl.
CPC .................... *G06F 9/544* (2013.01)

(58) Field of Classification Search
CPC ...................................... G06F 9/544
See application file for complete search history.

(56) References Cited

U.S. PATENT DOCUMENTS 11,169,720 B1 * 11/2021 Al-Harbi ............... G06F 16/188
11,803,535 B2 * 10/2023 Bailey ................. G06F 16/2365
(Continued)

FOREIGN PATENT DOCUMENTS

| CN | 107679192 A | 2/2018 |
| CN | 109922151 A | 6/2019 |

(Continued)

OTHER PUBLICATIONS

Chuck Ballard et al. "Moving Forward with the On Demand Real-time Enterprise", IBM, 2006 (Year: 2006).*
(Continued)

*Primary Examiner* — Kevin L Young
*Assistant Examiner* — Abdou K Seye
(74) *Attorney, Agent, or Firm* — Bayramoglu Law Offices LLC

(57) ABSTRACT

The disclosure relates to a method, apparatus and device for sharing microservice application data. The method includes: managing, through data registration management, memory data registration information that is to be loaded by microservice application clusters; determining, according to the memory data registration information, memory data that are required by the microservice application clusters; partitioning and distributing the memory data to a plurality of memory computation service nodes in the microservice application clusters, and deploying the plurality of memory computation service nodes into a corresponding microservice application cluster at a proximal end; and loading the memory data in a preset manner in the plurality of memory computation service nodes, and sharing a corresponding memory computation service node in real time under the condition that the memory data change.

8 Claims, 6 Drawing Sheets

(56) References Cited

U.S. PATENT DOCUMENTS

| | | | | |
|---|---|---|---|---|
| 2020/0133689 A1* | 4/2020 | Ferrell | ................ | G06F 9/45558 |
| 2023/0077708 A1 | 3/2023 | Jiang et al. | | |
| 2023/0236899 A1* | 7/2023 | Barton | ................ | G06F 11/3433 |
| | | | | 718/104 |
| 2024/0048476 A1* | 2/2024 | Adeel | .................... | H04L 45/22 |

FOREIGN PATENT DOCUMENTS

| | | | |
|---|---|---|---|
| CN | 110365750 A | 10/2019 | |
| CN | 113449000 A | 9/2021 | |
| CN | 114500655 A | 5/2022 | |
| CN | 115242879 A | 10/2022 | |
| CN | 115567251 A | 1/2023 | |
| CN | 115865404 A | 3/2023 | |
| CN | 116016678 A | 4/2023 | |
| CN | 116166756 A | 5/2023 | |
| WO | 2020237797 A1 | 12/2020 | |

OTHER PUBLICATIONS

Xiao Jiongen, et al., Data Governance in the Context of Big Data: Sharing Mechanism and Management Mechanism Research, Science and Technology Management Research, 2018, pp. 188-194, No. 17.

Wang Xiaojun, et al., Research on the Construction of Resource Sharing Platform Based on MicroService, International Conference on Smart Grid and Electrical Automation, 2017, pp. 713-717.

Xiaofeng He, et al., Java Applications for Data Sharing in Distributed Cluster Computing, Security Modeling, Algorithms and Programming, pp. 43-44.

\* cited by examiner

METHOD, APPARATUS AND DEVICE FOR SHARING MICROSERVICE APPLICATION DATA

CROSS REFERENCE TO THE RELATED APPLICATIONS

This application is the Continuation Application of International Application No. PCT/CN2023/110600, filed on Aug. 1, 2023, which is based upon and claims priority to Chinese Patent Application No. 202310456957.6, filed on Apr. 26, 2023, the entire contents of which are incorporated herein by reference.

TECHNICAL FIELD

The description relates to the technical field of computers, in particular to a method, apparatus and device for sharing microservice application data.

BACKGROUND

A large-scale business system in a microservice architecture features countless real-time data sharing scenarios including basic data sharing, business flow, real-time aggregation computation and query caching between various business microservices and intra-microservice cluster nodes.

In the above scenario, a distributed memory database is commonly used in the industry. When the distributed memory database is, for example, a Redis cluster, a data provider writes shared data to the Redis cluster and shares them in real time, and a user accesses the data through Redis. However, sharing mass data in real time through the Redis cluster has the following problems:

At first, the system complexity will be increased probably due to dependence of real-time data sharing on the Redis cluster. An operating burden of the system will be increased probably in the case of an excessive volume of data to be shared in real time. In addition, the system efficiency of the real-time data sharing will be lowered probably since data access involves serialization, deserialization and data transmission that are indispensable to real-time data sharing. Further, the system performance will be degraded probably since data are generally required to be extracted to a local computer for processing including data filtering, multi-table association, and aggregation computation probably involved in real-time data sharing.

SUMMARY

One or more embodiments of the description provide a method, apparatus and device for sharing microservice application data for solving the technical problems in the background.

One or more embodiments of the description use the following technical solution:

A method for sharing microservice application data according to one or more embodiments of the description includes:
  managing, through data registration management, memory data registration information that is to be loaded by microservice application clusters;
  determining, according to the memory data registration information, memory data that are required by the microservice application clusters;
  partitioning and distributing the memory data to a plurality of memory computation service nodes in the microservice application clusters, and deploying the plurality of memory computation service nodes into a corresponding microservice application cluster at a proximal end; and
  loading the memory data in a preset manner in the plurality of memory computation service nodes, and sharing a corresponding memory computation service node in real time under the condition that the memory data change.

An apparatus for sharing microservice application data according to one or more embodiments of the description includes:
  a registration management unit configured to manage, through data registration management, memory data registration information that is to be loaded by microservice application clusters;
  a memory data determination unit configured to determine, according to the memory data registration information, memory data that are required by the microservice application clusters;
  a node distribution unit configured to partition and distribute the memory data to a plurality of memory computation service nodes in the microservice application clusters, and deploy the plurality of memory computation service nodes into a corresponding microservice application cluster at a proximal end; and
  a data sharing unit configured to load the memory data in a preset manner in the plurality of memory computation service nodes, and share a corresponding memory computation service node in real time under the condition that the memory data change.

A device for sharing microservice application data according to one or more embodiments of the description includes:
  at least one processor, and a memory in communication connection with the at least one processor, where the memory stores an instruction executable by the at least one processor, and when executed by the at least one processor, the instruction enables the at least one processor to:
  manage, through data registration management, memory data registration information that is to be loaded by microservice application clusters;
  determine, according to the memory data registration information, memory data that are required by the microservice application clusters;
  partition and distribute the memory data to a plurality of memory computation service nodes in the microservice application clusters, and deploy the plurality of memory computation service nodes into a corresponding microservice application cluster at a proximal end; and
  load the memory data in a preset manner in the plurality of memory computation service nodes, and share a corresponding memory computation service node in real time under the condition that the memory data change.

At least one technical solution used in the embodiment of the description can achieve the following beneficial effects:

According to the embodiment of the description, the memory data to be loaded by the microservice application cluster are partitioned and distributed to the plurality of memory computation service nodes in the microservice application clusters, and the plurality of memory computation service nodes are deployed in the corresponding microservice application cluster at the proximal end, such that real-time sharing of the memory data are finally implemented without relying on a Redis cluster during such a process. In addition, movement of the memory data can be reduced, and processes of serialization and deserialization during data transmission can be omitted. Further, in the case of processing such as data filtering, multi-table association and aggregation computation, the memory data are no longer needed to be extracted to a local computer, such that system performance is improved overall.

BRIEF DESCRIPTION OF THE DRAWINGS

To describe technical solutions in embodiments of the description or in the prior art more clearly, accompanying drawings required in explanation of the embodiments or in the prior art will be described briefly below. Apparently, the embodiments in the following explanation are merely some embodiments described in the description, and a person of ordinary skill in the art can still derive other accompanying drawings from these accompanying drawings without creative efforts. In the accompanying drawings.

DETAILED DESCRIPTION OF THE EMBODIMENTS

Figure 1:
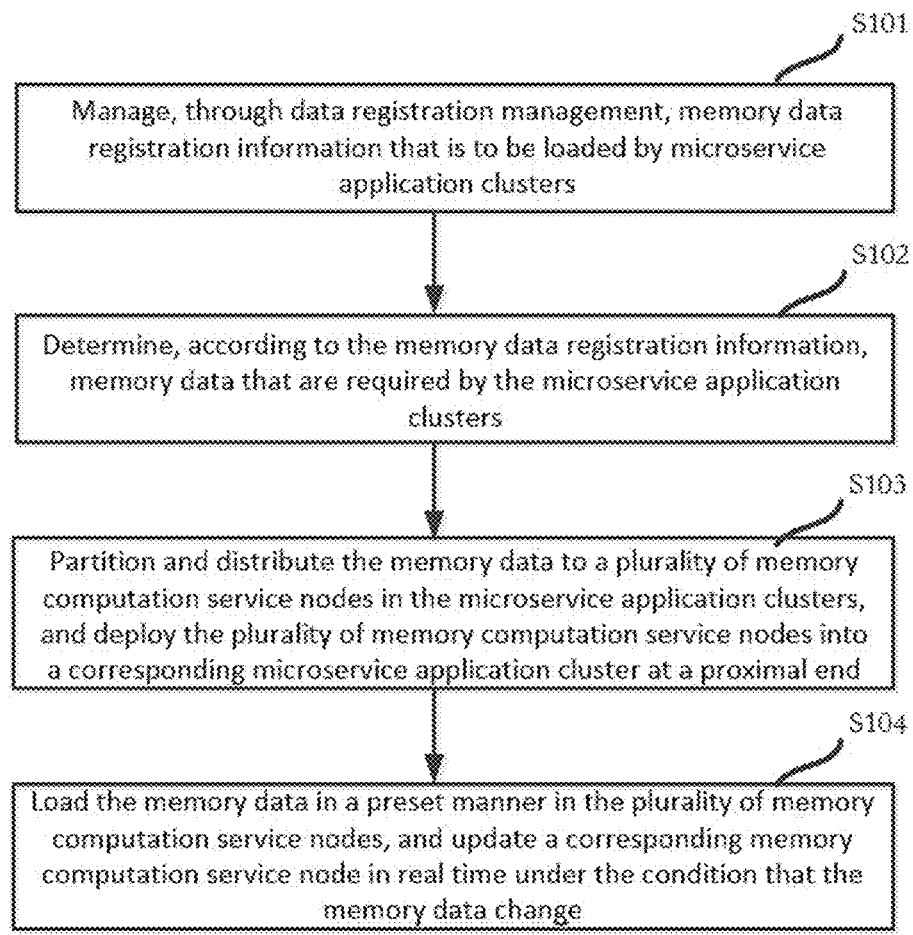
FIG. 1 is a schematic flowchart of a method for sharing microservice application data according to one or more embodiments of the description.

Embodiments of the description provide a distributed on-demand proximal-end memory computation method, apparatus and device.

For the above scenario, there are three available solutions, that is, remote procedure call protocol (RPC) interface call, a multi-write mechanism based on a message queue and a distributed memory database.

In the case of the RPC interface call, that is, a service interface is provided at a data provider, and a data user can share the data in real time by calling the interface. By this method, some problems such as low efficiency, high coupling and poor scalability are caused, and data serialization/deserialization, transmission and other processes are required by data transmission across services, such that pressures on an application and the database of the data provider are increased at the same time. Through the RPC interface call, the coupling between two parties is high, and scalability is poor when demand changes.

In the case of the multi-write mechanism based on the message queue, that is, data are stored in a plurality of copies in a provider and a user. After the data are initialized, incremental data are synchronized through the message queue. The provider sends a message when a business happens, and the user listens to and synchronizes the message to a local database through message subscription. This solution can basically implement sharing of basic data and other data with little change. However, there are still several problems. At first, the solution is complicated to implement, and mechanisms such as data initialization and consistency guarantee are required, especially the consistency guarantee is complicated and depends on message-oriented middleware, such that system complexity is improved. Second, users in scenarios such as business flow, real-time aggregation computation, and query caching do not require data spilled to a disk. Third, the data are quasi-real-time synchronized, and cannot satisfy a scenario with high real-time requirements. Finally, data such as business flow is frequently shared, which increases a pressure on a database of the user of shared data.

In the case of the distributed memory database, such as Redis, that is, a data provider writes the shared data to a Redis cluster and shares same in real time, and a user accesses the data through the Redis. This solution has the following problems: First, dependence on the Redis cluster is caused, such that system complexity is increased. Second, data access includes serialization, deserialization and transmission, such that low efficiency is caused. Third, data filtering, multi-table association and aggregation computation are implemented, such that inconvenient processing is caused. Data are usually extracted to a local computer for further processing, such that cost is increased and performance is influenced.

A large-scale business system in a microservice architecture has a complex structure and a large volume of data. In the industry, memory caching and computation technology are generally used to deal with performance bottleneck caused by persistent storage access. When a memory database or centralized memory computation middleware is used, there are performance losses such as data transmission, and serialization/deserialization, and in the case of high concurrency and a large volume of data, it is likely to produce a bottleneck of an access hotspot.

To make the technical solutions in the description to be better understood by a person of ordinary skill in the art, the technical solutions in the embodiments of the description will be clearly and completely described blow with reference to the accompanying drawings in the embodiments of the description. Apparently, the described embodiments are merely some embodiments rather than all embodiments of the description. All other embodiments derived by a person of ordinary skill in the art from the embodiments of the description without creative efforts shall fall within the protection scope of the description.

FIG. 1 is a schematic flowchart of a method for sharing microservice application data according to one or more embodiments of the description. The process may be executed by a sharing system for microservice application data. Manual intervention and adjustment can be performed on some input parameters or intermediate results during the process permit to assist in improvement in accuracy.

The method according to the embodiment of the description includes:

S101, memory data registration information that is to be loaded by microservice application clusters are managed through data registration management.

S102, memory data that are required by the microservice application clusters are determined according to the memory data registration information.

In the embodiment of the description, the registration information may include a memory data subscription relation. When the memory data that are required by the microservice application clusters are determined according to the memory data registration information, a microservice application cluster subscribed by the memory data may be determined according to the memory data subscription relation. According to the microservice application cluster subscribed by the memory data, the memory data that are required by the microservice application clusters are determined.

In the embodiment of the description, the memory data that are required by the microservice application clusters may also be preset according to the memory data subscription relation, and the memory data may be directly allocated to a corresponding microservice application cluster according to the memory data subscription relation. Each microservice application cluster may include a plurality of memory computation service nodes.

Further, the registration information in the embodiment of the description may also include a memory data structure and microservice application information, and the memory data structure may be defined according to an entity structure of a business entity framework. Before the memory data are distributed to the plurality of memory computation service nodes in the microservice application clusters, application database connection information corresponding to the microservice application clusters may be determined according to the microservice application information, the microservice application clusters are connected to corresponding application databases, and the application database may store relevant data of a corresponding microservice application cluster. In addition, the memory data structure may be defined according to the entity structure of the business entity framework, and may be clipped as needed.

S103, the memory data are partitioned and distributed to a plurality of memory computation service nodes in the microservice application clusters, and the plurality of memory computation service nodes are deployed in a corresponding microservice application cluster at a proximal end.

In the embodiment of the description, the step that the memory data are partitioned and distributed to a plurality of memory computation service nodes includes: the memory data are partitioned and distributed to a memory computation service node corresponding to an application microservice node through a node filtration mechanism, and it is guaranteed that the memory data are stored in the memory computation service node that has the memory data subscription relation. The node filtration mechanism can be preset to classify and filter the memory data, and finally distribute the classified and filtered memory data to the memory computation service node corresponding to the application microservice node.

In the embodiment of the description, before the memory data are distributed to the plurality of memory computation service nodes in the microservice application clusters, the memory computation service nodes of the microservice application clusters may be determined according to deployment information of the microservice application clusters and a preset memory computation service node discovery mechanism. Finally, a memory computation service cluster may be established according to the memory computation service node of the microservice application clusters. The memory computation service cluster may integrate the memory computation service nodes and improve processing capacity between the memory computation service nodes.

S104, the memory data are loaded in a preset manner in the plurality of memory computation service nodes, and a corresponding memory computation service node is shared in real time under the condition that the memory data change.

In the embodiment of the description, loading in the preset manner may include parallel loading. The step that the memory data are loaded in a preset manner in the plurality of memory computation service nodes includes: a memory computation service is activated, and memory data of all memory computation service nodes are loaded in parallel. The memory data are loaded in parallel in the plurality of memory computation service nodes, such that data initialization efficiency can be greatly improved, and startup and restart time of the partition nodes can be shortened.

In the embodiment of the description, loading in the preset manner may further include on-demand loading. The step that the memory data are loaded in a preset manner in the plurality of memory computation service nodes includes: memory data to be loaded are determined according to a microservice application to which the memory computation service node belongs. A set of partition columns is determined according to a partition column pre-obtained for the memory data to be loaded. A value range of a partition column to be loaded from the set of partition columns is determined by the memory computation service node through hash computation. The memory data to be loaded are loaded according to the value range of the partition column.

In the embodiment of the description, the step that a corresponding memory computation service node is shared in real time under the condition that the memory data change includes: memory data of a corresponding memory computation service node are shared in real time according to the memory data registration information under the condition of listening to change in business data of a business entity framework corresponding to the memory data.

In the embodiment of the description, when the partitioned and distributed memory data are deployed, the memory data may be deployed in an application service process, such that hardware and operation and maintenance cost can be reduced. Data and computation logics are multiplexed in the process (at a proximal end of the application), such that data movement can be reduced, costs of serialization and deserialization during data transmission can be saved, performance can be improved, throughput can be improved, and a bottleneck of a centralized access hotspot can be effectively alleviated.

In the embodiment of the description, the memory computation service may provide data access and computation services for the microservice application. The memory computation service includes providing a distributed access service of the memory data inside the microservice application cluster by using a Map Reduce mechanism, a computational task engine of a Map Reduce mechanism, and a data access interface of a current node.

In the embodiment of the description, the memory data may include data of an account balance and an auxiliary balance. When the microservice is activated, a business entity framework loads the data of the account balance and the auxiliary balance into a memory in parallel.

The business entity framework receives the data of the account balance and the auxiliary balance, and may call a preset computation task for real-time computation and synchronize same to the computation node.

In the embodiment of the description, the data registration management includes:

providing microservice unit management, and managing a database and an application service process through microservice units;

providing business entity management and managing data structures;

providing configuration of memory caching for the business entity, cached partition columns and a number of replicas;

providing publishing and subscription configuration for the business entity, and permitting the business entity to be subscribed by other microservice units; and providing a business entity change capture mechanism for capturing business data changes in real time and distributing data to corresponding memory computation nodes in real time.

Figure 2:
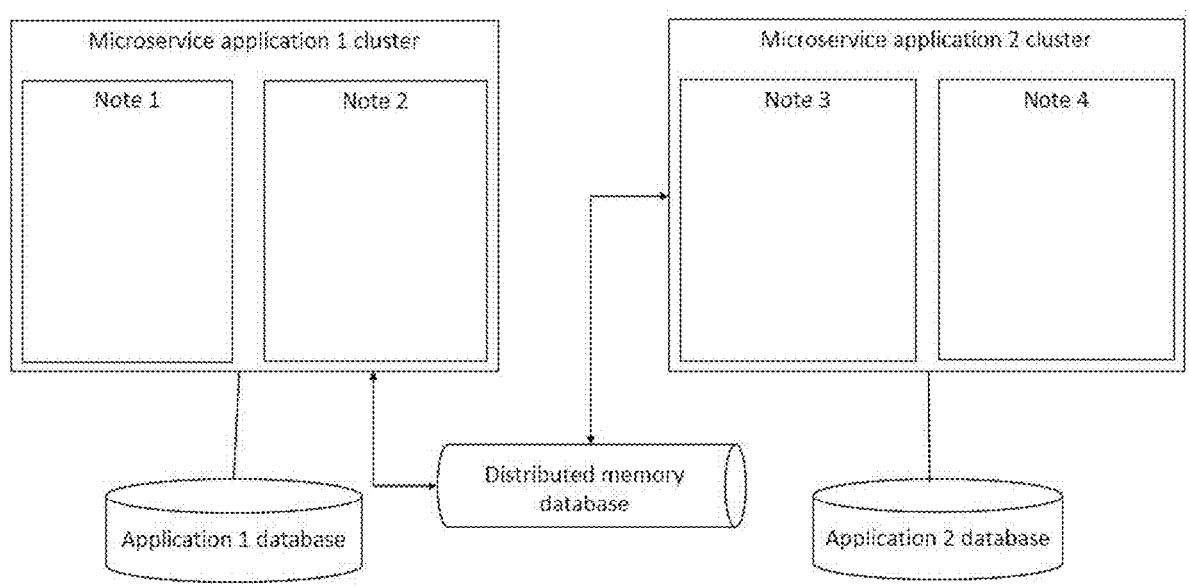
FIG. 2 is a schematic diagram of an existing distributed memory database according to one or more embodiments of the description.

It should be noted that the embodiment of the description provides a decentralized on-demand proximal-end memory computation method for solving a bottleneck of a centralized access hotspot in the existing memory caching and memory computation technologies. In order to solve the bottleneck of the centralized access hotspot, the embodiment of the description may use a distributed and decentralized architecture, and data are distributed to different nodes as needed, and there is no dependency relation between different nodes. This design can greatly improve the data throughput and effectively alleviate the bottleneck of the centralized access hotspot, as shown in the schematic diagram of an existing distributed memory database in FIG. 2.

Figure 3:
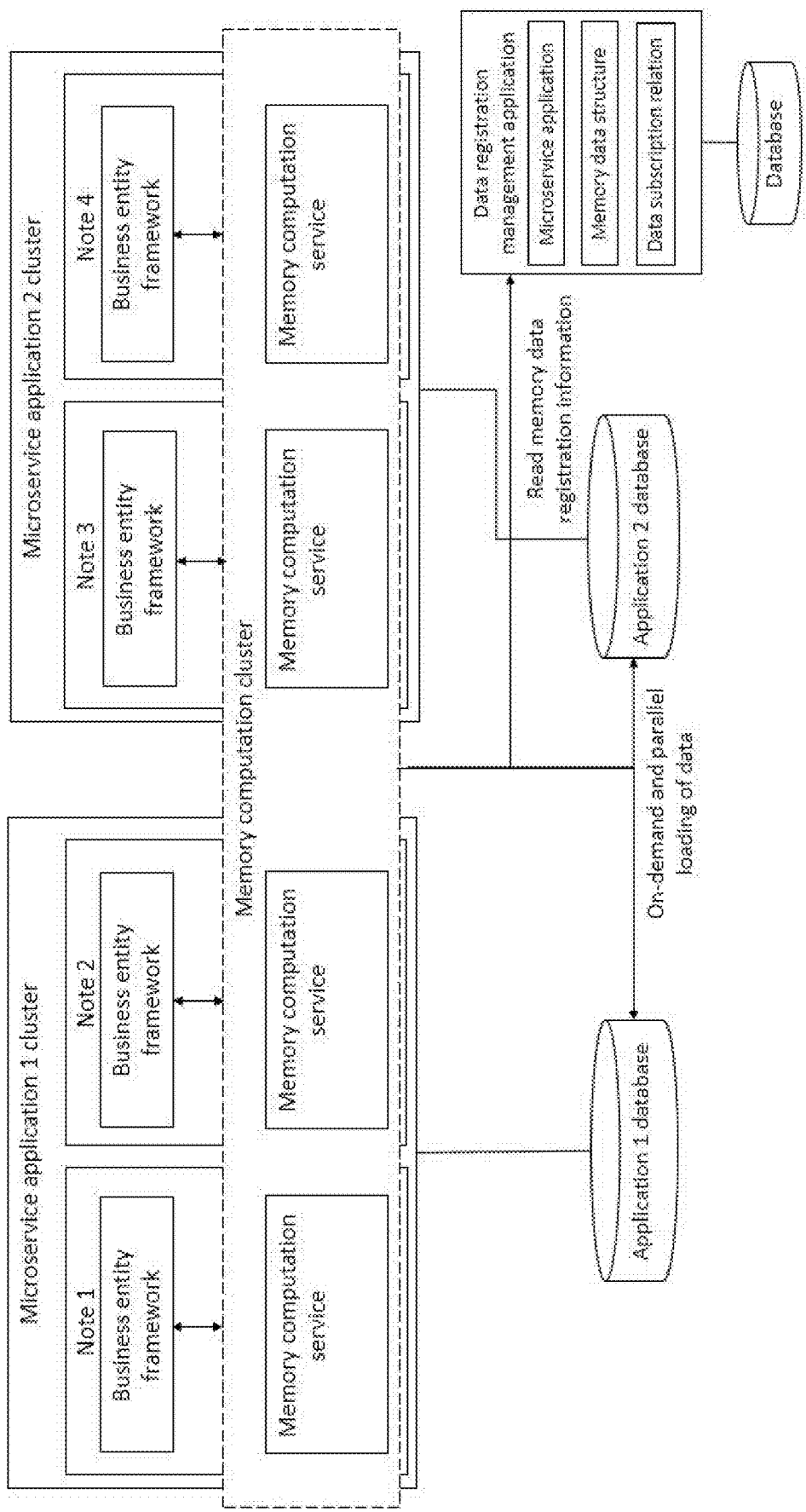
FIG. 3 is a schematic diagram of decentralized on-demand proximal-end memory computation according to one or more embodiments of the description.

Further, FIG. 3 is a schematic diagram of decentralized on-demand proximal-end memory computation according to the embodiment of the description. By reading memory data registration information in a data registration management APP, memory data required by a microservice application 1 cluster and a microservice application 2 cluster are determined, and an application 1 database corresponding to the microservice application 1 cluster and an application 2 database corresponding to the microservice application 2 cluster are determined. The microservice application 1 cluster includes a node 1 and a node 2. The node 1 and the node 2 each include a business entity framework and a memory computation service node. The microservice application 2 cluster includes a node 3 and a node 4. The node 3 and the node 4 each include a business entity framework and a memory computation service node. In addition, memory computation service nodes of each node form a memory computation cluster.

In terms of a data distribution strategy, the embodiment of the description uses the business entity framework to describe an original data structure and a microservice unit where original data structure is located, uses a memory data registry to manage a memory data structure, a data source, a posting and subscription relation, etc. to be loaded by the microservice unit, and distributes and loads data as needed according to deployment information of microservice unit and the memory data registry. Through the above design, the data are reasonably distributed to different nodes according to a user (microservice unit), the nodes can be scaled according to a transaction volume of different businesses (microservice units), and the throughput of hotspot data access is improved through flexible deployment of nodes. At the same time, different data can be configured with different copies, such that hotspot data can be stored in a plurality of copies on different nodes, and the access throughput of hotspot data is greatly improved.

In the aspect of data caching initialization loading, parallel loading design is used. The distributed data memory computation nodes load data in parallel as needed according to a configured data structure, data source and posting and subscription relation, such that data initialization efficiency is greatly improved and start and restart time of the nodes are shortened.

In the aspect of data incremental synchronization, data change capture technology is used to listen to a change in business data in real time according to a mechanism provided by the business entity framework, and automatically distribute data to corresponding data caching and computation nodes according to the data posting and subscription relation configured in the memory data registry. Through the above incremental synchronization mechanism, consumption of data synchronization is reduced, consistency and a real-time performance of memory data are guaranteed, and the throughput is greatly improved further.

In the aspect of memory computation deployment, a solution where memory computation nodes are deployed in the application service process is used, such that deployment of the memory computation cluster can be omitted, and hardware and operation and maintenance cost can be reduced. In addition, data and computation logics are multiplexed in the process (at a proximal end of the application), such that data movement can be reduced, costs of serialization and deserialization during data transmission can be saved, performance can be improved, throughput can be improved, and a bottleneck of a centralized access hotspot can be effectively alleviated.

The embodiment of the description includes data registration management and business entity framework.

The data registration management has the following features:

1) providing microservice unit management, and managing a database and application process through microservice units (MSU);
2) providing business entity management and managing business data structures with one business entity belonging to a unique microservice unit;
3) providing configuration of memory caching for the business entity, cached partition columns and a number (1 by default) of replicas;
4) providing publishing and subscription configuration for the business entity, and permitting the business entity to be subscribed by other business units; and
5) integrating a business entity change capture mechanism for capturing business data changes in real time, and distributing data to corresponding memory computation nodes in real time according to the above configuration.

The business entity framework has the following features:

1) using a decentralized distributed architecture, and automatically discovering networking according to configuration;
2) using a deployment manner in which deployment is implemented in the application process;
3) providing an interface for dynamically maintaining a memory structure according to the business entity description;
4) automatically loading data on demand in parallel by all nodes based on the partition column according to the data registration management configuration information when the microservice cluster is activated;
5) automatically synchronizing incremental data by listening to a data change event in the entity framework;
6) providing an access interface for business data, and supporting data addition, deletion, modification and query;

7) providing an elastic scaling mechanism, and implement automatic rebalancing on the data after the node changes; and 8) providing data multi-copy management.

The application scenarios of the embodiment of the description include data caching (such as query results), real-time data sharing (such as basic data sharing across microservices), and real-time computation (such as budget control, daily/monthly/annual sales).

Figure 4:
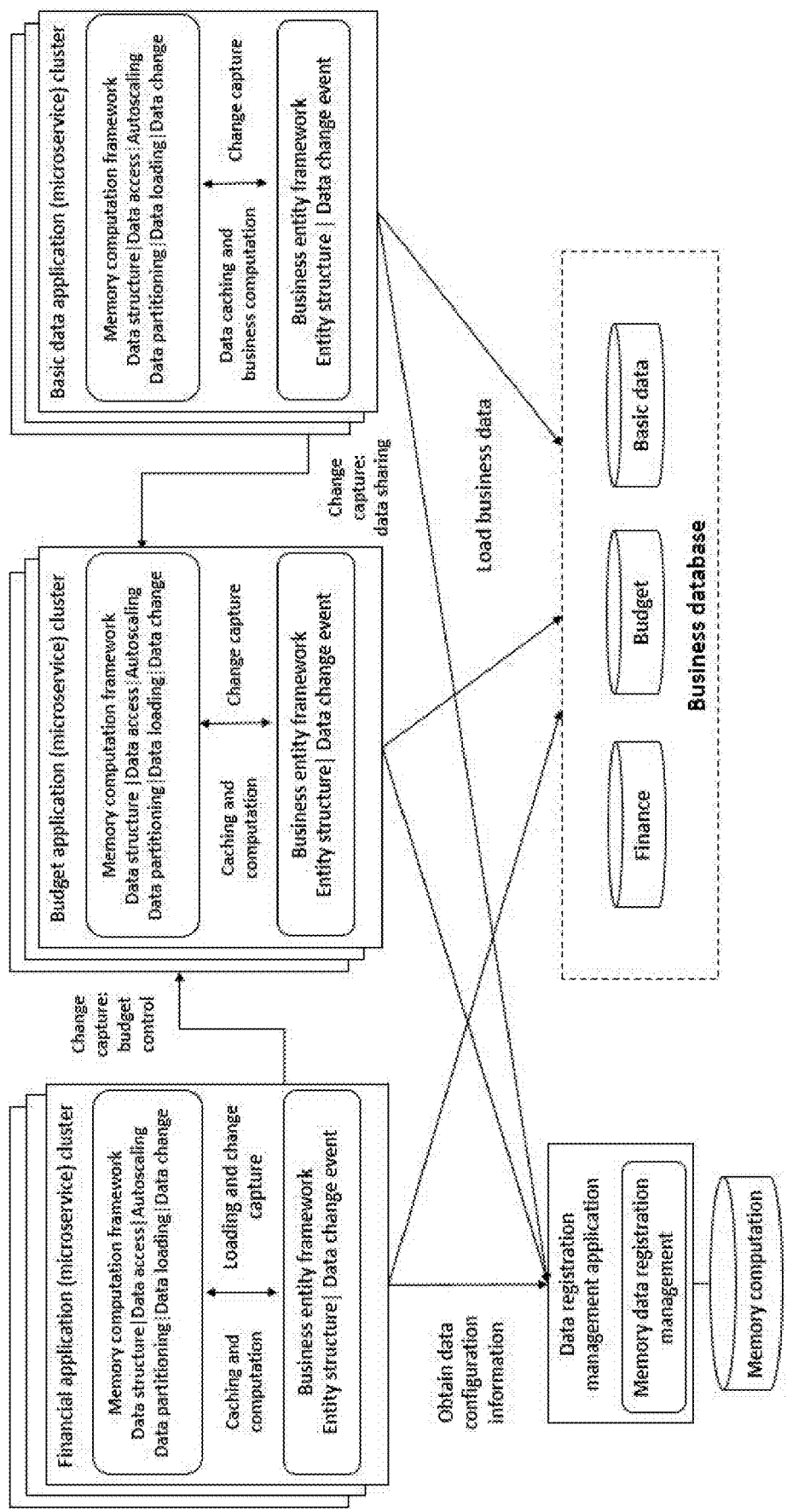
FIG. 4 is a schematic diagram of data caching and real-time data sharing according to one or more embodiments of the description.

FIG. 4 is a schematic diagram of data caching and real-time data sharing. In the figure, finance, budget and basic data are three microservices, and each microservice may be deployed in clusters (multi-nodes), and each microservice corresponds to an independent database. Data registration management is configured with a business entity structure required by a business entity framework, a data subscription relation by a microservice unit and other information, and each microservice APP merely needs to load needed data. The basic data include a company, a department, personnel, a customer, a supplier, etc. Most of these data will be used by the finance and the budget, and need to be shared in real time in the microservices of the finance and the budget. Based on that, it is necessary to configure subscription relations of the finance and budget microservices to basic data of the company, the department, personnel, etc. in data registration management. The finance includes data such as an account, a voucher, an account balance and an auxiliary balance, and needs to be cached in a memory. Voucher data will be referenced by the budget, and it is necessary to configure a subscription relation to the voucher data of the budget microservice in data registration. The budget includes a budget table definition, a budget table, etc., and needs to be cached in the memory. The voucher data subscribed by the budge will be used for budget control and bookkeeping. For example, an expense account on the voucher will be recorded in a corresponding expense budget execution number. When the above microservices are activated, the business entity framework will load data from a corresponding database in parallel (for example, four nodes are deployed for each microservice, and these four nodes load data at the same time) and on demand (load the required content according to registered data, compute a hash value according to the partition column, and load the data distributed to this node).

Figure 5:
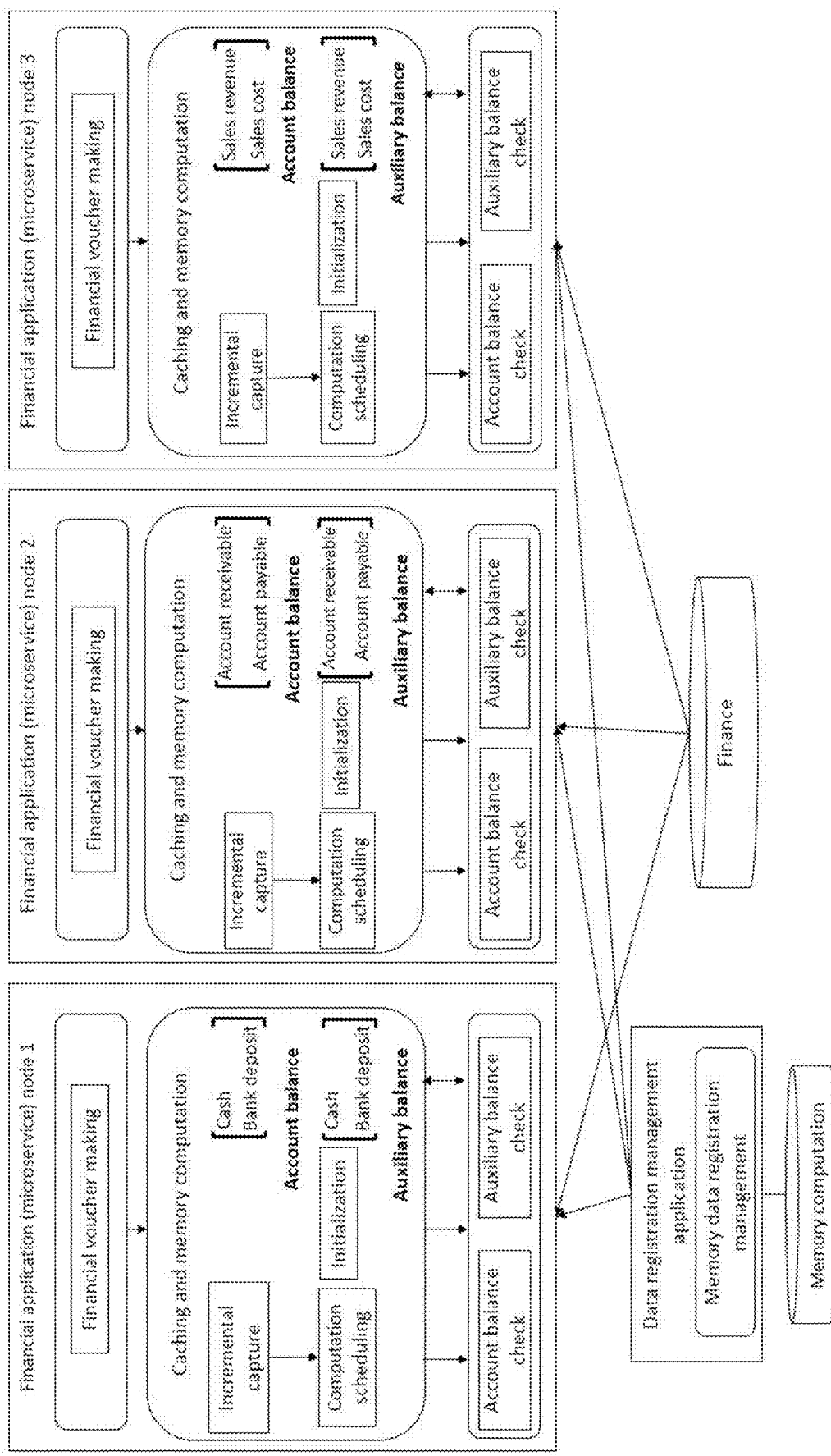
FIG. 5 is a schematic diagram of real-time computation according to one or more embodiments of the description.

FIG. 5 is a schematic diagram of real-time computation. In the diagram, the financial microservice may be deployed in clusters (nodes as shown in FIG. 5). The account balance and the auxiliary balance are checked very frequently, and are cached in the memory for improving performance, and data of the account balance and the auxiliary balance change at any time with the business. In order to distribute the data reasonably and satisfy most of the computation performance requirements, the account balance and auxiliary balance are partitioned by account. When the microservice is activated, the business entity framework loads the account balance and the auxiliary balance data into the memory in parallel (in three nodes at the same time) according to the account. When a business (voucher making) happens at the same time, incremental business data will be captured and sent to the business entity framework, and will be sent to different nodes according to a hash value of the account. When receiving the business data, the business entity framework will call a computation task developed in advance for real-time computation and share same to the account balance and auxiliary balance in the memory. For a related query, a query result is directly obtained from the memory.

Figure 6:
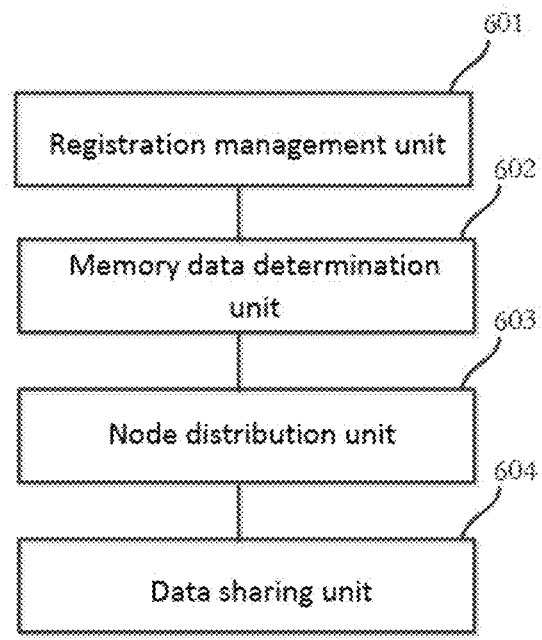
FIG. 6 is a schematic structural diagram of an apparatus for sharing microservice application data according to one or more embodiments of the description.

FIG. 6 shows an apparatus for sharing microservice application data according to one or more embodiments of the description. The apparatus includes a registration management unit 601, a memory data determination unit 602, a node distribution unit 603 and a data sharing unit 604.

The registration management unit 601 is configured to manage, through data registration management, memory data registration information that is to be loaded by microservice application clusters.

The memory data determination unit 602 is configured to determine, according to the memory data registration information, memory data that are required by the microservice application clusters.

The node distribution unit 603 is configured to partition and distribute the memory data to a plurality of memory computation service nodes in the microservice application clusters, and deploy the plurality of memory computation service nodes into a corresponding microservice application cluster at a proximal end.

The data sharing unit 604 is configured to load the memory data in a preset manner in the plurality of memory computation service nodes, and share a corresponding memory computation service node in real time under the condition that the memory data change.

Figure 7:
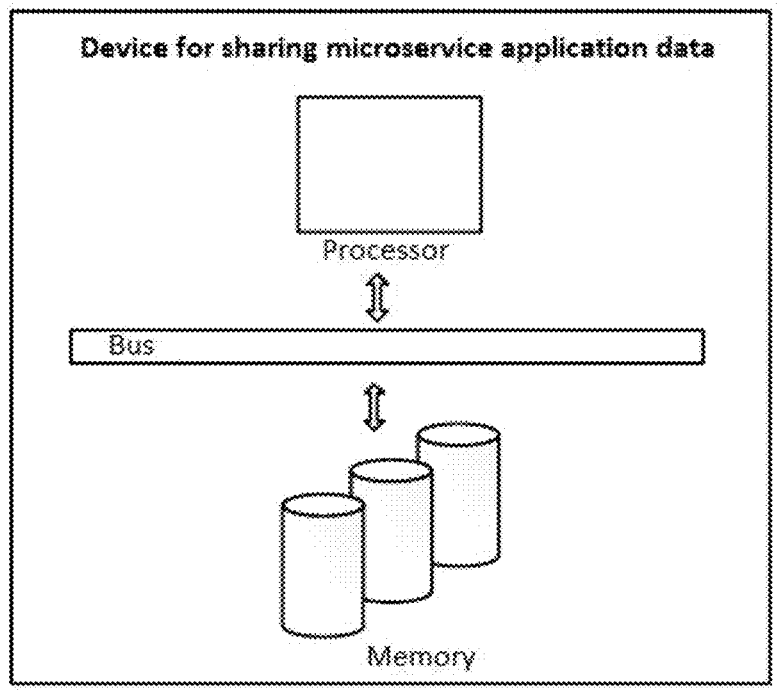
FIG. 7 is a schematic structural diagram of a device for sharing microservice application data according to one or more embodiments of the description.

FIG. 7 is a schematic structural diagram of a device for sharing microservice application data according to one or more embodiments of the description. The device includes:
at least one processor, a bus, and a memory in communication connection with the at least one processor, where the memory stores an instruction executable by the at least one processor, and when executed by the at least one processor, the instruction enables the at least one processor to:
manage, through data registration management, memory data registration information that is to be loaded by microservice application clusters;
determine, according to the memory data registration information, memory data that are required by the microservice application clusters;
partition and distribute the memory data to a plurality of memory computation service nodes in the microservice application clusters, and deploy the plurality of memory computation service nodes into a corresponding microservice application cluster at a proximal end; and
load the memory data in a preset manner in the plurality of memory computation service nodes, and share a corresponding memory computation service node in real time under the condition that the memory data change.

The embodiments in the description are described in a progressive manner, mutual reference can be made to the same or similar parts of the embodiments, and each embodiment focuses on description of differences from the other embodiments. In particular, the embodiments of the apparatus, the device and a nonvolatile computer storage medium are basically similar to the method embodiment, and are described relatively simply as a result, and reference can be made to description of the method embodiment for relevant contents.

Specific embodiments of the description have been described above. Other embodiments should fall within the scope of the appended claims. In some cases, actions or steps described in the claims can be performed in an order different than that in the embodiments and still achieve the desired results. In addition, processes described in the accompanying drawings do not necessarily require the specific order shown or the sequential order for desired results. In some implementation, multitasking and parallel processing are also possible or can be advantageous.

The above embodiment is merely one or more embodiments of the description, and is not used to limit the description. It is apparent to a person of ordinary skill in the art that one or more embodiments of the description can have various modifications and changes. Any modification, equivalent substitution, improvement, etc. made within the spirit and principle of one or more embodiments of the description should fall within the scope of the claims of the description.

The invention claimed is:

1. A method for sharing a microservice application data, comprising:
managing, through data registration management, memory data registrating information to be loaded by microservice application clusters;
determining, according to the memory data registrating information, memory data required by the microservice application clusters, wherein the memory data registrating information comprises a memory data subscription relation information, the determining the memory data required by the microservice application clusters comprises:
determining a microservice application cluster subscribed by the memory data according to the memory data subscription relation information; and
determining the memory data required by the microservice application clusters according to the microservice application cluster subscribed by the memory data;
partitioning and distributing the memory data to a plurality of memory computation service nodes in each one of the microservice application clusters, and deploying the plurality of memory computation service nodes at a corresponding microservice application cluster in a proximal end deployment manner; and
loading the memory data in a preset manner in the plurality of memory computation service nodes, and sharing a corresponding memory computation service node in real time under a condition that the memory data change, wherein the registration information comprises a memory data structure and microservice application information, and the memory data structure is defined according to an entity structure of a business entity framework; and before the partitioning and distributing the memory data to the plurality of memory computation service nodes in the microservice application clusters, the method further comprises: determining application database connection information corresponding to the microservice application clusters according to the microservice application information, and connecting the microservice application clusters to corresponding application databases.

2. The method according to claim 1, wherein before the partitioning and distributing the memory data to the plurality of memory computation service nodes in the microservice application clusters, the method further comprises:
determining the memory computation service nodes of the microservice application clusters according to deployment information of the microservice application clusters and a preset memory computation service node discovery mechanism; and
establishing a memory computation service cluster according to the memory computation service nodes of the microservice application clusters.

3. The method according to claim 1, wherein the partitioning and distributing the memory data to the plurality of memory computation service nodes comprises:
partitioning and distributing the memory data to a memory computation service node corresponding to an application microservice node through a node filtration mechanism, and guaranteeing that the memory data are stored in the memory computation service node having the memory data subscription relation information.

4. The method according to claim 1, wherein the loading in the preset manner comprises parallel loading; and
the loading the memory data in the preset manner in the plurality of memory computation service nodes comprises:
activating a memory computation service, and loading memory data of all memory computation service nodes in parallel.

5. The method according to claim 1, wherein loading in the preset manner comprises on-demand loading; and
the loading the memory data in the preset manner in the plurality of memory computation service nodes comprises:
determining memory data to be loaded according to a microservice application, wherein the memory computation service node belongs to the microservice application;
determining a set of partition columns according to a partition column pre-obtained for the memory data to be loaded;
determining a value range of a partition column to be loaded from the set of partition columns by the memory computation service node through hash computation; and
loading the memory data to be loaded according to the value range of the partition column.

6. The method according to claim 1, wherein the sharing the corresponding memory computation service node in real time under the condition that the memory data change comprises:
sharing memory data of the corresponding memory computation service node in real time according to the memory data registrating information under a condition of listening to change in business data of a business entity framework corresponding to the memory data.

7. An apparatus for sharing a microservice application data,
a registration management unit configured to manage, through data registration management, in-memory data registrating information to be loaded by microservice application clusters;
a memory data determination unit configured to determine, according to the memory data registrating information, memory data required by the microservice application clusters, wherein the memory data registrating information comprises a memory data subscription relation information, the memory data determination unit is further configured to determine a microservice application cluster subscribed by the memory data according to the memory data subscription relation information; and determine the memory data required by the microservice application clusters according to the microservice application cluster subscribed by the memory data;
a node distribution unit configured to partition and distribute the memory data to a plurality of memory computation service nodes in each one of the microservice application clusters, and deploy the plurality of memory computation service nodes at a corresponding microservice application cluster in a proximal end deployment manner; and a data sharing unit configured to load the memory data in a preset manner in the plurality of memory computation service nodes, and share a corresponding memory computation service node in real time under a condition that the memory data change, wherein the registration information comprises a memory data structure and microservice application information, and the memory data structure is defined according to an entity structure of a business entity framework; application database connection information corresponding to the microservice application clusters is determined according to the microservice application information, to connect the microservice application clusters to corresponding application databases.

8. A device for sharing a microservice application data, comprising:

at least one processor, and a memory in communication connection with the at least one processor, wherein the memory stores an instruction executable by the at least one processor, and when executed by the at least one processor, the instruction enables the at least one processor to:

manage, through data registration management, memory data registrating information that is to be loaded by microservice application clusters;

determine, according to the memory data registrating information, memory data that are required by the microservice application clusters, wherein the memory data registrating information comprises a memory data subscription relation information, the instruction further enables the at least one processor to:

determine a microservice application cluster subscribed by the memory data according to the memory data subscription relation information; and determine the memory data required by the microservice application clusters according to the microservice application cluster subscribed by the memory data;

partition and distribute the memory data to a plurality of memory computation service nodes in each one of the microservice application clusters, and deploy the plurality of memory computation service nodes at a corresponding microservice application cluster in a proximal end deployment manner; and load the memory data in a preset manner in the plurality of memory computation service nodes, and share a corresponding memory computation service node in real time under a condition that the memory data change, wherein the registration information comprises a memory data structure and microservice application information, and the memory data structure is defined according to an entity structure of a business entity framework; application database connection information corresponding to the microservice application clusters is determined according to the microservice application information, to connect the microservice application clusters to corresponding application databases.

* * * * *